United States Patent [19]

Matsui et al.

[11] Patent Number: 5,177,356
[45] Date of Patent: Jan. 5, 1993

[54] OPTICAL ENCODER

[75] Inventors: Kenji Matsui; Atsushi Ieki, both of Niwa, Japan

[73] Assignee: Okuma Corp., Aichi, Japan

[21] Appl. No.: 764,193

[22] Filed: Sep. 23, 1991

[30] Foreign Application Priority Data

Sep. 28, 1990 [JP] Japan ................................. 2-258897

[51] Int. Cl.⁵ .............................................. G01D 5/34
[52] U.S. Cl. .......................... 250/231.16; 250/237 G
[58] Field of Search ................ 359/566; 356/377, 374, 356/356, 358; 250/237 G, 231.14, 231.16, 231.18; 33/707

[56] References Cited

U.S. PATENT DOCUMENTS 2,747,797  5/1956  Beaumont ..................... 250/231.18
4,096,383  6/1978  Mancini et al. ................ 250/231.14
4,776,701 10/1988  Pettigrew ........................... 356/356

*Primary Examiner*—Constantine Hannaher
*Assistant Examiner*—Edward J. Glick
*Attorney, Agent, or Firm*—Wenderoth, Lind & Ponack

[57] ABSTRACT

An optical encoder irradiating light emitted from a light emitting unit includes a rectangular collimator lens having a rectangular face onto a main scale which moves in the longitudinal direction, receives the collimated light beam passing the main scale in a light receiving unit, and optically reads the displacement of the main scale. Since the collimator lens is rectangular, the light emitting unit can be made compact without decreasing the irradiation area of a light beam which is effective in the detection of the displacement. Furthermore, it is possible to increase the irradiation area of the light beam by dividing a collimated light beam from the collimator lens into a plurality of diffracted light beams by a transmitting or reflecting diffracton grating.

4 Claims, 2 Drawing Sheets

OPTICAL ENCODER

BACKGROUND OF THE INVENTION

1. Field of the Invention

The present invention relates to an optical encoder used for position measurement in a machine tool and the like.

2. Description of the Related Art

FIG. 1 is a perspective view of a typical optical encoder. There are disposed a light emitting unit TL composed of light sources LD for irradiating lights to a main scale MS which moves in the longitudinal direction, collimator lenses CL and a mirror MR, and a light beams receiving unit RL which is disposed opposite to the light emitting unit TL across the main scale MS in order to read the displacement of the main scale MS by an optical means. The main scale MS has gratings formed by repeated transmitting portions and non-transmitting portions and having a length corresponding to the longitudinal measurement length. Light beams emitted from the light sources LD such as laser diodes are respectively collimated by the respective collimator lenses CL, reflected by the mirror MR, and enter the main scale MS. It is possible to make the optical encoder compact by refracting the optical paths by means of the mirror MR as shown in FIG. 1.

In general, it is preferable that the area of a light beam which irradiates a main scale MS may be large since the larger the area is, the more the errors of gratings formed on the main scale MS can be properly averaged and decrease. Furthermore, in an absolute encoder, since a plurality of grating tracks are formed on the main scale MS and it is necessary to simultaneously irradiate the grating tracks, a light beam having a large irradiation area is necessary.

If the above-mentioned light beam having a large irradiation area is necessary in a conventional optical encoder, a plurality of sets of light sources LD and collimator lenses CL are arranged to irradiate the main scale MS as shown in FIG. 1. However, the grating tracks of the main scale MS is in the shape of a strip and a section of an effective light beam which is photoelectrically converted by the light receiving unit RL is rectangular, while the respective collimator lenses CL are circular. Therefore, the collimator lenses CL are required to be large in order to form an effective light beam having a rectangular section, and as a result, the light emitting unit TL is also large. For example, when a light beam having a rectangular section of 10 mm square is formed, collimator lenses CL having an effective aperture of 14 mm are necessary.

It is also required that a plurality of light beams emitted from the light emitting unit TL each be collimated and the optical axes of the light beams be parallel to one another. In order to meet these requirements, the performance of each of the collimator lenses CL should be excellent and the positions of the light sources LD and the collimator lenses CL should be accurately adjusted.

SUMMARY OF THE INVENTION

With the above problems in view, an object of the present invention is to provide an optical encoder having a simple and compact light emitting unit for emitting collimated light beams whose irradiation areas are large and whose optical axes are parallel to one another.

According to one aspect of the present invention, for achieving the objects described above, there is provided an optical encoder characterized in irradiating a collimated light beam emitted from a light emitting unit having a collimator lens which converts light from a light source into said collimated light beam and which is rectangularly shaped in the direction of the optical axis of said light onto a main scale which moves in the longitudinal direction, receiving said collimated light beam passing through said main scale in a light receiving unit, and optically reading the displacement of said main scale.

The nature, principle and utility of the invention will become more apparent from the following detailed description when read in conjunction with the accompanying drawings.

DETAILED DESCRIPTION OF THE PREFERRED EMBODIMENTS

Figure 1:
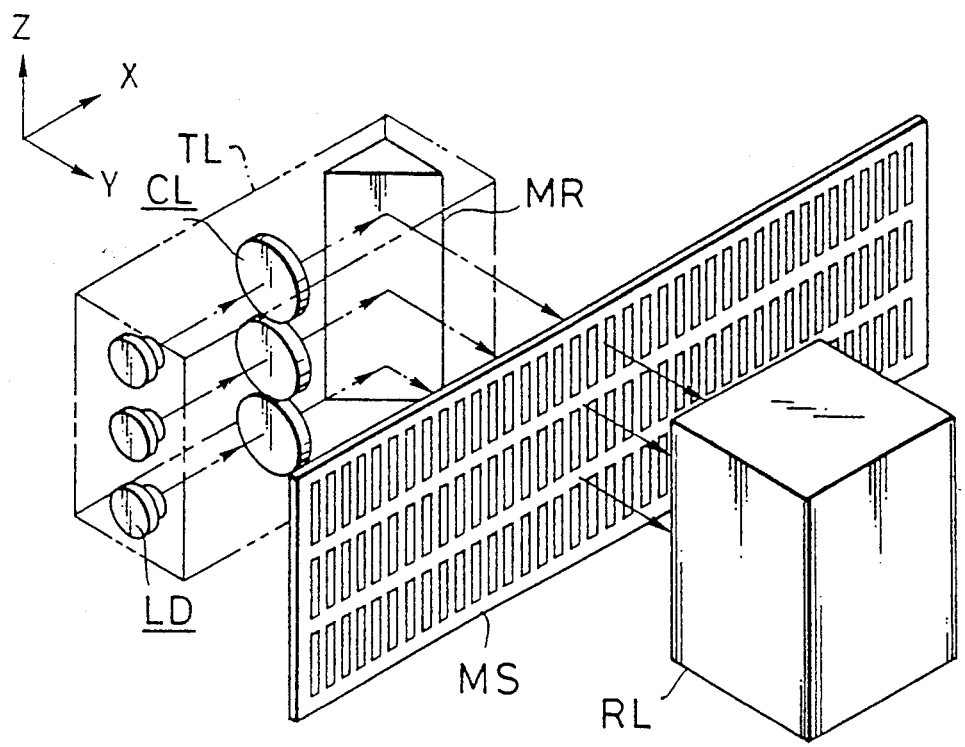
FIG. 1 is a perspective view of a conventional optical encoder.
Figure 2:
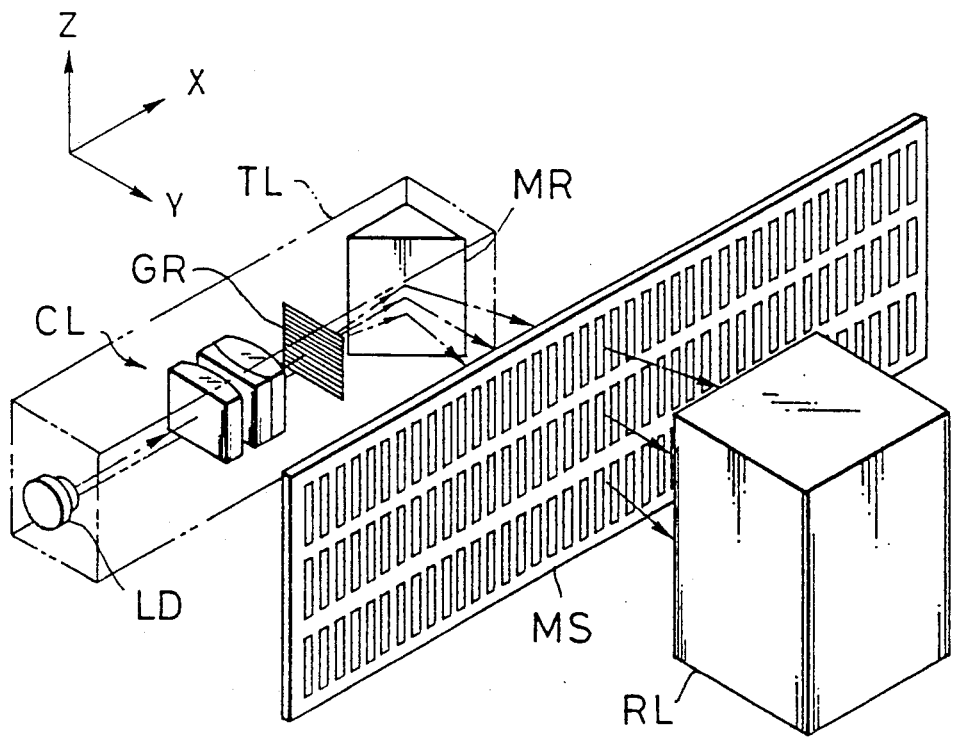
FIGS. 2 to 4 are perspective views of optical encoders according to embodiments of the present invention, respectively.

FIG. 2 is a perspective view of an optical encoder according to a first embodiment of the present invention in comparison with FIG. 1. The same components as those in FIG. 1 are denoted by the same numerals and the description of these components has been omitted.

A light emitting unit TL of an optical encoder according to this embodiment is different from the conventional optical encoder and is described below. Light emitted from a light source LD, for example, a laser diode is collimated by a collimator lens CL. The collimator lens CL is rectangular and has an effective area including a rectangular effective light beam which is subsequently photoelectrically converted by a light receiving unit RL. Although a combination lens composed of a plurality of single lenses is used as the collimator lens CL in FIG. 2, an aspheric lens which shows excellent performance may be used. The collimated light passing through the collimator lens CL enters a transmissive diffraction grating GR and is divided into a plurality of diffracted light beams. The angle of the diffracted light beams is determined by a grating constant p of the diffraction grating GR, and the intensity ratio of the diffracted light beams is determined by the state of the diffraction grating GR, for example, the width of each grating line. Therefore, the direction and intensity of the diffracted light beams can be controlled by appropriately changing the grating constant p, the width of the grating line and so on. These diffracted light beams are reflected by a mirror MR, and enter respective grating tracks on a main scale MS. Although the optical axes of the diffracted light beams which enter the main scale MS spread in the direction z in this embodiment, if the direction of the grating lines engraved on the main scale MS coincides with the direction z, it is likely that the spread of the optical axes of the diffracted light beams does not have any influence on the detection of displacement of the main scale MS. As described above, according to this embodiment, it is possible to make the light emitting unit TL smaller in the directions y and z by using the rectangular collimator lens CL, and to obtain a plurality of light beams which are excellent collimated beams having optical axes forming a plane which is parallel to the z axis only by adjusting the positions of the high-performance collimator lens CL and the light source LD.

Figure 3:
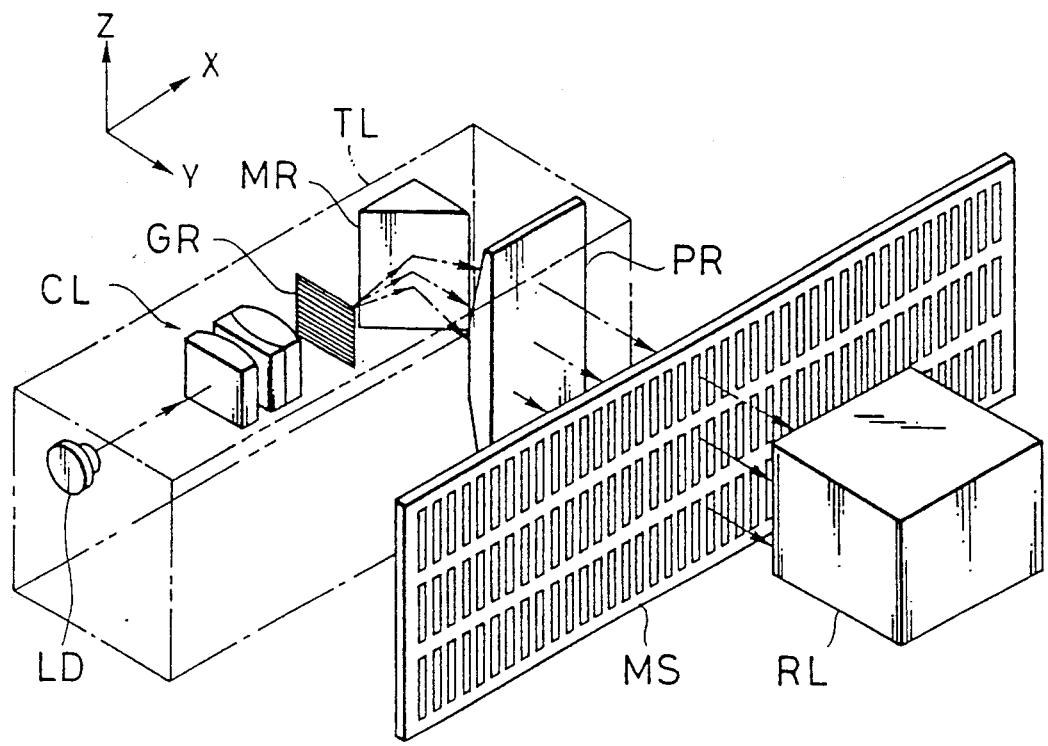

FIG. 3 is a perspective view of an optical encoder according to a second embodiment of the present invention in comparison with FIG. 2. The same components as those in FIG. 2 are denoted by the same numerals and the description of these components has been omitted. The optical encoder in this embodiment is different from the optical encoder of the first embodiment in additionally having a prism PR in the light emitting unit TL. Light beams reflected by the mirror MR are refracted by the prism PR, and thus the optical axes of the light beams are parallel to one another in the direction z as well as forming a plane which is parallel to the z axis. Therefore, it is possible to arrange optical devices close to one another in the light receiving unit RL, and thus to make the optical encoder more compact.

Figure 4:
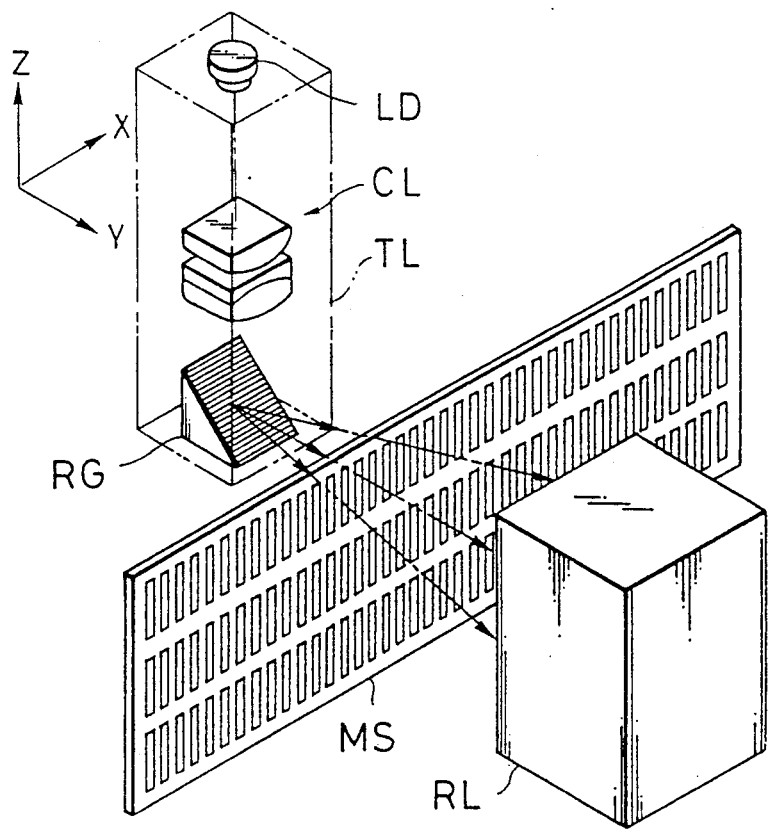

FIG. 4 is a perspective view of an optical encoder according to a third embodiment of the present invention in comparison with FIG. 2. The same components are denoted by the same numerals and the description of these components has been omitted. In the optical encoder of this embodiment, a reflecting diffraction grating RG is located in the light emitting unit TL instead of the diffraction grating GR and the mirror MR in the optical encoder of the first embodiment. A collimated light beam passing through the collimator lens CL enters the reflecting diffraction grating RG and is divided into a plurality of diffracted light beams. The angle of the diffracted light beams is determined by a grating constant p, and the intensity ratio of the diffracted light beams is determined by the state of the grating, for example, the width of each grating line. Therefore, the direction and intensity of the diffracted light beams can be controlled by appropriately changing the grating constant p, the width of the grating line and so on. The reflected light beams enter respective grating tracks on the main scale MS. Although the optical axes of the diffracted light beams which enter the main scale MS spread in the direction z in this embodiment, if the direction of the grating lines formed on the main scale MS coincides with the direction z as described above, it is likely that the spread of the optical axes of the diffracted light beams does not have any influence of the detection of displacement of the main scale MS. Furthermore, it is possible to obtain a plurality of collimated light beams whose optical axes are parallel to one another in the z direction by putting the prism PR described in the second embodiment between the reflecting diffraction grating RG and the main scale MS.

The transmitting and reflecting diffraction gratings described in the above embodiments each may be an amplitude grating or a phase grating.

As described above, according to the optical encoder of the present invention, since collimated light beams each having a large irradiation area can be obtained by a compact light emitting unit having a small number of components to be adjusted, it is possible to lower the price of, especially, an absolute encoder having a main scale including a plurality of grating tracks, and to make the encoder compact.

It should be understood that many modifications and adaptations of the invention will become apparent to those skilled in the art and it is intended to encompass such obvious modifications and changes in the scope of the claims appended hereto.

What is claimed is:

1. An optical encoder for irradiating a collimated light beam, said collimated light beam being emitted from a light emitting unit having a rectangularly shaped collimator lens which converts light emitted from a light source into said collimated light beam which is rectangularly shaped in the direction of the optical axis of said light beam, and said collimated light beam being irradiated onto a main scale which moves in a longitudinal direction which is perpendicular to grating lines on a grating face of said main scale, said encoder receiving said collimated light beam passing through said main scale in a light receiving unit, and optically reading the displacement of said main scale.

2. An optical encoder according to claim 1, wherein a diffraction grating for dividing said collimated light beam into a plurality of diffracted collimated light beams which are rectangularly shaped is disposed in said light emitting unit and wherein optical axes of said diffracted collimated light beams form a plane which is parallel to said grating lines of said main scale.

3. An optical encoder according to claim 2, wherein said diffraction grating is one of an amplitude grating and a phase grating.

4. An optical encoder according to claim 2, wherein a prism for refracting optical paths of said plurality of diffracted collimated light beams is located in said light emitting unit for causing optical axes of said plurality of diffracted collimated light beams to be parallel.

* * * * *